United States Patent
Hollingsworth

[11] Patent Number: 6,067,715
[45] Date of Patent: May 30, 2000

[54] WIRE AND CABLE STRIPPING TOOL

[76] Inventor: Elmont Hollingsworth, 12100 Wander La., Austin, Tex. 78750

[21] Appl. No.: 09/162,577

[22] Filed: Sep. 29, 1998

Related U.S. Application Data

[60] Provisional application No. 60/081,341, Apr. 9, 1998.

[51] Int. Cl.[7] .............................. H02G 1/12; B21F 13/00; B26B 3/00
[52] U.S. Cl. .............................. 30/90.4; 30/90.8; 30/278; 30/289; 30/351; 81/9.44
[58] Field of Search .................................. 30/90.4, 90.1, 30/90.8, 91.1, 91.2, 92.5, 351, 353, 355, 278, 280, 279.4, 282, 287, 289, 293, 294, 314, 317, 279.2; 29/764; 81/9.4, 9.42, 9.43, 9.44

[56] References Cited

U.S. PATENT DOCUMENTS

| | | | |
|---|---|---|---|
| 2,817,255 | 12/1957 | Lormeau | 30/91.2 |
| 2,903,064 | 9/1959 | Blonder | 30/90.4 |
| 3,620,104 | 11/1971 | Horrocks | 30/90.1 X |
| 4,083,105 | 4/1978 | ViPond | 30/90.4 |
| 4,951,393 | 8/1990 | Wallace . | |
| 5,325,593 | 7/1994 | Chen . | |
| 5,337,479 | 8/1994 | Ducret . | |
| 5,487,220 | 1/1996 | Saitou | 30/90.6 |
| 5,491,894 | 2/1996 | Bieganski | 30/90.1 |
| 5,535,519 | 7/1996 | Brimmer . | |
| 5,561,903 | 10/1996 | Bourbeau | 30/90.4 |
| 5,659,962 | 8/1997 | Tagou . | |
| 5,829,322 | 11/1998 | Chen | 81/9.44 |

FOREIGN PATENT DOCUMENTS

| | | | |
|---|---|---|---|
| 1261360 | 4/1961 | France | 30/90.9 |

*Primary Examiner*—M. Rachuba
*Assistant Examiner*—Boyer Ashley

[57] ABSTRACT

The present invention is a tool for stripping a sliver-like section of the outer sheath from a multi-conductor cable or insulation from an insulated wire. The tool includes a blade and interconnected blade guide to strip the outer sheath from a cable or insulation from a wire without damaging interior contents. The tool has a handle including an upper and lower arm. The upper arm includes a blade-carrying portion and the lower arm includes a portion for guiding the cable or wire relative to the blade. The blade is pivotally attached to the blade-carrying portion. The upper arm may be springably attached to the lower arm and biased to a position such that the cable or wire can be inserted into the region between the blade and the guiding portion or the lower arm without any significant manipulation of the handle.

16 Claims, 3 Drawing Sheets

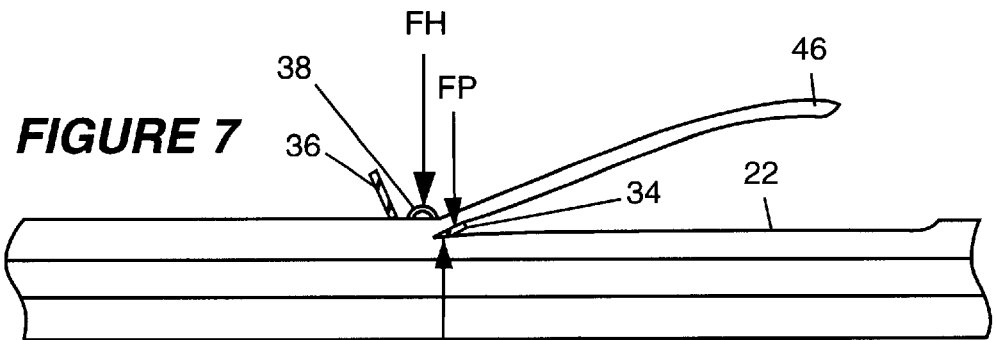
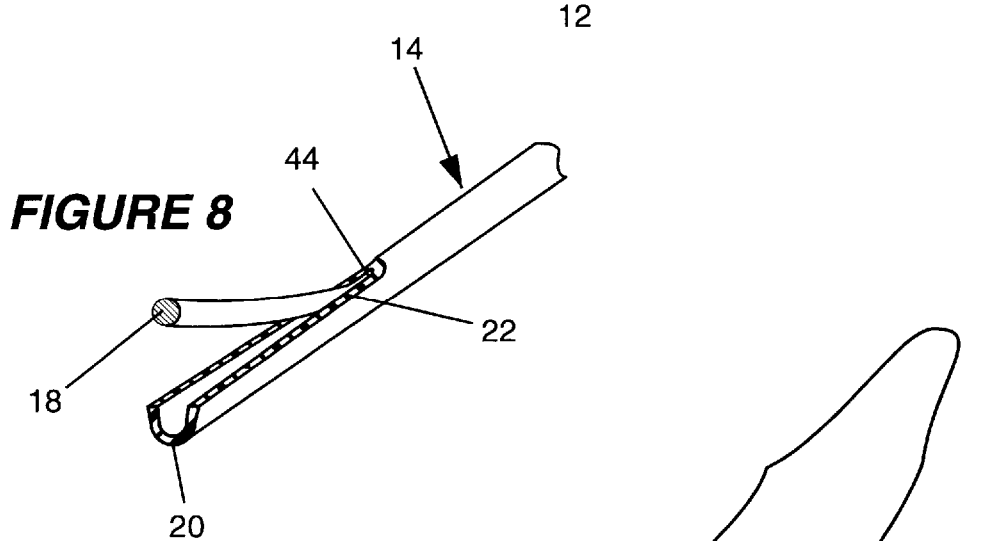
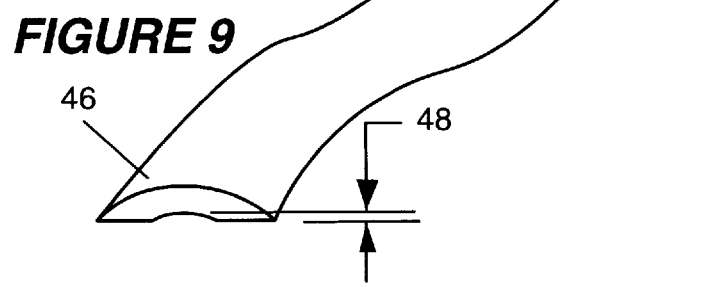
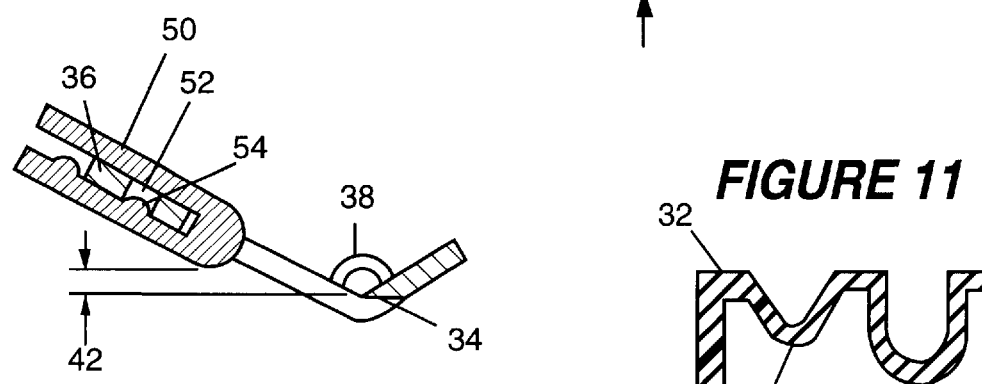
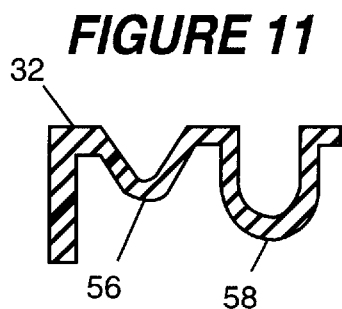

WIRE AND CABLE STRIPPING TOOL

CROSS REFERENCE TO RELATED APPLICATIONS

This application relates to U.S. provisional patent application Ser. No. 60/081,341 filed on Apr. 9, 1998 by Elmont Hollingsworth, the application being incorporated herein by reference in its entirety.

BACKGROUND OF THE INVENTION—FIELD OF THE INVENTION

This invention relates generally to wire and cable strippers. More particularly this invention relates to a hand-held stripping tool for removing a sliver-like segment of the outer sheath from a multi-conductor cable or an insulated wire. The stripper of the present invention is configured to longitudinally strip the insulation or sheath from a wire or cable without damaging the underlying contents of the cable or conductor.

BACKGROUND OF THE INVENTION— DESCRIPTION OF THE PRIOR ART

The stripping of wires and cables is a common aspect of modifying, constructing, and maintaining electrical equipment and facilities. Common types of wires and cables include multi-conductor cables such as "ROMEX" brand cable sold by General Cable Corporation for distributing power, coaxial cables as used for the wiring of communications devices such as satellite receivers, and single conductor insulated wires used for any number of applications.

As shown in FIG. 1A, a multi-conductor cable 10 will typically have an oblong cross-section and an outer sheath 12 around at least two individually insulated wires 14. Each insulated wire 14 includes a conductor 18 with insulation 20. An un-insulated wire 16 is typically included in the cable 10 for grounding purposes. The sheath 12 and insulation 20 establish a sheath interface 22. Similarly, the insulation 20 and the conductor 18 establish a conductor interface 23.

FIG. 1B shows a coaxial cable 15. The coaxial cable 15 has a conductor 18 at its center with insulation 20 around it. The coaxial cable 15 further includes a metallic grounding layer 17 around insulation 20 and a sheath 12 around the grounding layer 17. As with the wire 14 of the multi-conductor cable, the coaxial cable will typically have a round cross-section.

When stripping multi-conductor cables, it is necessary to slit or strip the outer sheath to gain access to the interior contents and then strip the insulation from the individual wires to expose the conductors. Stripping coaxial cables requires slitting or stripping the outer sheath, severing the grounding layer, and then stripping the insulation to expose the conductor. Regardless of the type of wire or cable being prepared, it is desirable to slit or strip the outer sheath or insulation without damaging an underlying insulation or conductor.

There are a number of prior art tools and methods for accomplishing the stripping of the sheath of a multi-conductor cable or the insulation from an insulated wire. A common method is to use a pocketknife to slit the sheath along the longitudinal axis of the cable and then make a cut around the circumference to remove the severed portion of the sheath and expose the conductors. Although this method will suffice, it has the potential of damaging the insulation on the individual conductors. Furthermore, physical injury to the party stripping the cable is also possible. To simplify the process of stripping these types of wires and cables, many types of specialized tools have been developed and are well know in the art.

U.S. Pat. No. 4,951,393 to Wallace discloses a wire stripper especially adapted for stripping multi-conductor cable such as "ROMEX" brand cables. Wallace teaches a tool having a blade for slitting the outer sheath of the cable to a depth approximately equal to the thickness of the sheath material. The tool may further include a separate blade arrangement having a plurality of sharpened circular openings for stripping the insulation from the individual insulated wires. The tool disclosed by Wallace includes a guide for controlling the depth of the slit in the sheath. However, variations in the thickness of the sheath, selection of different size cables, and variations in the pressure applied to the slitting blade during operation will result in a slit depth that is either slightly greater or less than the thickness of the sheath. A slitting depth slightly less than the sheath thickness will result in the sheath being difficult to remove and a slitting depth slightly greater than the sheath thickness can inadvertently damage the insulation on the individual insulated wires. Furthermore, the tool as taught by Wallace does not readily allow for longitudinal stripping long lengths of the insulation from insulated wires.

U.S. Pat. No. 5,535,519 to Brimmer also teaches a tool for stripping insulation from a cable or wire. Brimmer teaches a tool that comprises a pair of handles similar to that of pliers. However, the handles operate a pair of jaws adapted for cutting insulation. Each jaw includes a series of semi-circular cutting edges that combine to form a series of circular openings when the jaws are in the closed position. Each jaw also carries non-circular cutting edges that combine to form a dumbbell-shaped opening when the jaws are in the closed position. The cutting edges are sharpened such that they can cut the insulation and allow it to be removed. The series of circular openings allow for round insulated wires of varying diameters to be stripped without appreciably damaging the conductor. The dumbbell-shaped opening is useful in stripping the outer sheath from cables such as "ROMEX" brand multi-conductor cables. The tool as taught by Brimmer does not readily allow for longitudinal slitting or stripping of insulation from conductors.

U.S. Pat. No. 5,325,593 to Chen teaches a double bladed vegetable peeler having pivotally mounted blades and guides similar to that contemplated for the present invention. As the disclosed and claimed utility of the peeler is for removing the skin from a vegetable or fruit, an element or elements for guiding the tool along the longitudinal axis of a wire or cable is not disclosed. Without such a guiding element or elements, the orientation of the wire or cable relative to the tool and the force applied between the blade and the wire or cable would not be controllable. This uncontrolled stripping operation would result in the strip depth and location of the insulation or sheath to be inconsistent, causing damage to an underlying insulation or conductor.

SUMMARY OF THE INVENTION

Based on the current state of the art, an improved solution for stripping the outer sheath from multi-conductor cables and insulation from conductors is needed. Furthermore, a tool for stripping long lengths of sheath or insulation from along the longitudinal axis of wires and cables is needed. The present invention is a stripping tool for longitudinally removing a sliver-like segment of sheath or insulation from along at least one edge of a cable or wire. Further, the tool of the present invention strips a sliver-like segment of sheath or insulation without damaging the underlying contents of the cable or wire. Unlike prior art slitting and stripping devices, a stripping tool according to the present invention includes handle, a blade and a blade guide allowing a sliver-like segment of sheath or insulation to be stripped along the longitudinal axis of a cable or wire. The blade, guide and handle are of a configuration that minimizes the potential for the blade to damage the contents beneath the sheath or insulation.

Accordingly, it is an object of the present invention to provide a stripping tool that includes a blade with an associated blade guide. The blade guide cooperates with the blade such that the depth of cut is controlled whereby the contents beneath the sheath or insulation are not inadvertently stripped or damaged. The blade and blade guide may be of unitary construction or may be linked by a separate component. Furthermore, the blade guide may be adjustable to allow for stripping of insulation having extreme differences in thickness.

Another object of the present invention is to provide a stripping tool that has a handle having a portion for carrying the blade and a portion for guiding the cable or wire relative to the blade and guide. The blade-carrying portion and the guiding portion of the handle are connected such that pressure of a level suitable to maintain the cable or wire against the blade and blade guide can be readily maintained as the cable or wire is guided over the blade.

A further object of the present invention is to provide a stripping tool wherein the handle includes an upper arm and a lower arm. The upper arm is preferably in combination with the blade-carrying portion of the handle and lower arm is preferably in combination with the guiding portion of the handle. The upper and lower arms may be springably affixed to each other. The upper and lower arms are preferably biased to a position whereby the wire or cable can be inserted into the region between the blade and the guiding portion without any significant manipulation of the handle.

A still further object of the present invention is to provide a stripping tool wherein the blade and blade guide pivot relative to the blade-carrying portion of the handle. This pivoting action allows the blade and blade guide to react and adjust to contours in the wire or cable as well as to nominal variations in the applied pressure. The pivoting action contributes to the blade preferentially cutting the sheath or insulation to a depth equal to that of the thickness of the material being stripped. The pivoting action also contributes to the orientation of the handle not being critical to the preferential stripping action.

A yet further object of the present invention is to provide a stripping tool for wires and cables capable of stripping the outer sheath or insulation from a section of the wire or cable intermediate the two ends. The configuration of the blade, blade-guide and handle enable the stripping of a sliver-like section of sheath or insulation from a terminated wire or cable. An end of the cable or wire need not be available to perform the stripping operation.

Other objects and advantages of the present invention will become apparent to those skilled in the art from the detailed description below and from the accompanying drawings.

BRIEF DESCRIPTION OF THE DRAWINGS

FIG. 7 is a side view showing the various forces on the blade during the stripping operation.

FIG. 8 is a perspective view of an insulated wire with a portion of the insulation stripped using the stripping tool of the present invention.

FIG. 9 is a perspective view showing the profile of a sliver-like section of sheath or insulation stripped using a tool according to the present invention.

FIG. 10 is a cross sectional view of an adjustable blade guide in combination with a blade.

FIG. 11 is a cross sectional view of a guiding portion of the handle having a separate channels for round and oblong shaped wires and cables.

Figure 1A:
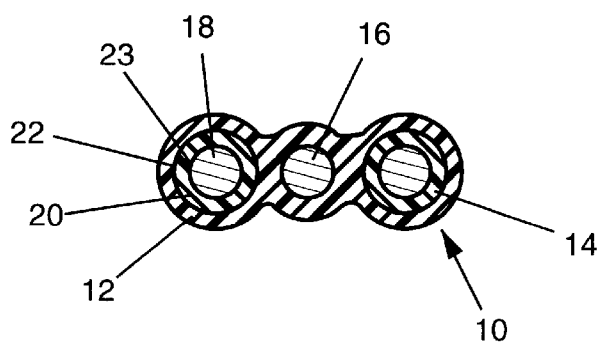
FIG. 1A is an end view of a multi-conductor cable, including two insulated wires and one uninsulated wire.
Figure 1B:
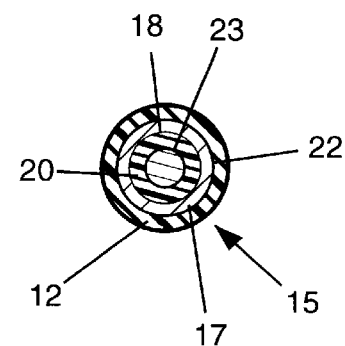
FIG. 1B is an end view of a coaxial cable.

Reference Numerals in Drawings:

| | | | |
|---|---|---|---|
| 10 | Multi-Conductor Cable | 12 | Outer Sheath |
| 14 | Insulated Wire | 15 | Coaxial Cable |
| 16 | Un-insulated Wire | 17 | Shielding Layer |
| 18 | Conductor | 20 | Insulation |
| 22 | Sheath Interface | 23 | Conductor Interface |
| 24 | Handle | 26 | Lower Arm |
| 28 | UpperArm | 29 | Rivet |
| 30 | Blade-carrying Portion | 32 | Guiding Portion |
| 34 | Blade | 36 | Blade Guide |
| 38 | Pin | 40 | Hole |
| 42 | Offset | 44 | Stripped Region |
| 46 | Silver-Like Section | 48 | Arched Section |
| 50 | Offset Adjuster | 52 | Hole |
| 54 | Detent | 56 | First Guiding Channel |
| 58 | Second Guiding Channel | FH | Applied Normal Force |
| FP | Positive-Acting Normal Force | FN | Negative-Acting Normal Force |

DESCRIPTION OF THE PREFERRED EMBODIMENTS

Figure 2:
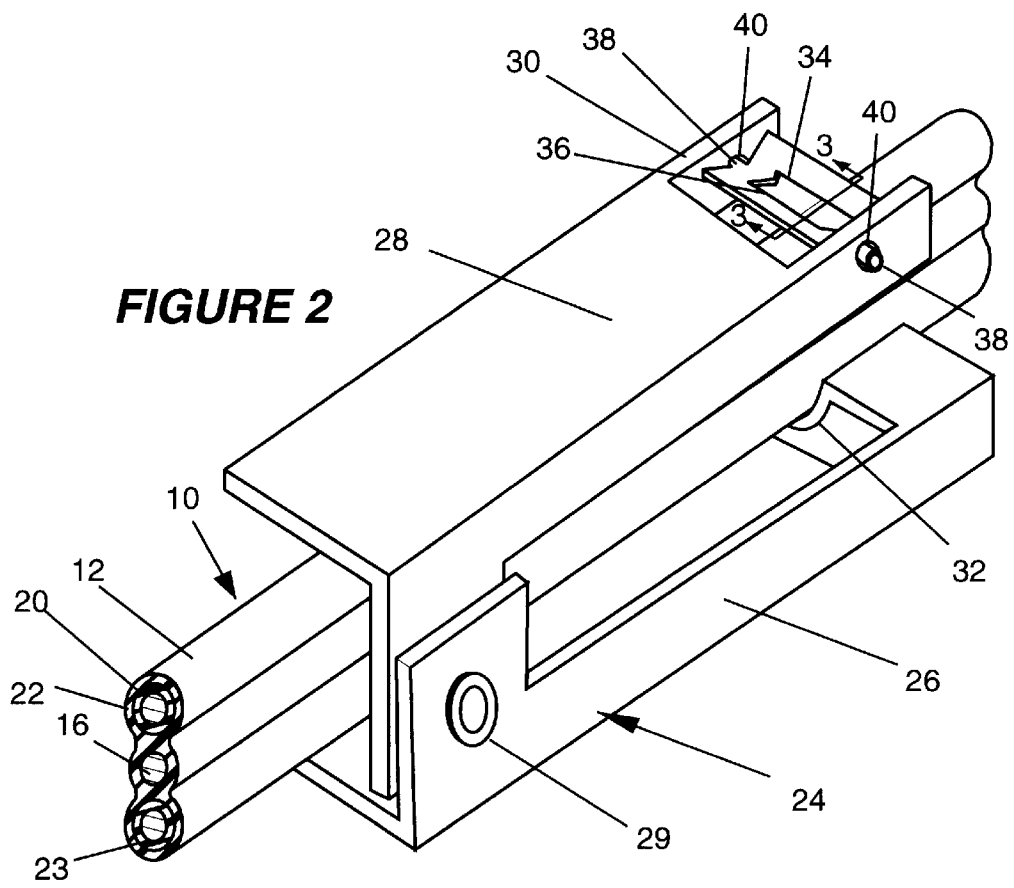
FIG. 2 is a perspective view of a stripping tool according to the present invention.

A stripping tool according to the present invention is shown in FIG. 2. The stripping tool includes a handle 24 that has a lower arm 26 and an upper arm 28. The upper arm 28 and lower arm 26 can be fabricated by stamping steel, molding plastic, or any other methods for forming such components from metal and plastic. The upper arm 28 has a blade-carrying portion 30 and the lower arm 26 has a guiding portion 32. The guiding portion 32 is configured to receive a wire, a cable or both and guide it longitudinally relative to the blade-carrying portion 30 of the handle 24.

The blade-carrying portion 30 of the handle 24 carries a blade 34 and a blade guide 36. As shown in FIG. 2, the opposing ends of the blade 34 each have a pin 38 which are received by the holes 40 in the blade-carrying portion 30. The blade 34, blade guide 36 and pins 38 are preferably integral and fabricated from steel. This arrangement allows the blade 34 and blade guide 36 to pivot relative to the handle 24. Alternatively, the blade 34, blade guide 36 and pins can be a combination of discrete components interconnected to each other.

The upper arm 28 and lower arm 26 are pivotally attached to each other by means such as a rivet 29. The lower arm 26 and upper arm 28 may also be springably biased by means such as a spring (not shown) to a position whereby a region between the blade 34 and the guiding portion 32 of the handle 24 for receiving a cable 10 or insulated wire 14 is established. The pivoting action of the handle 24 allows the cable 10 or insulated wire 14 to be forcibly brought into contact and maintained in contact with the blade 34 and blade guide 36 during the stripping operation.

The pivoting action of the blade 34 relative to the blade-carrying portion 30 of the handle 24 and the ability to forcibly engage the wire or cable against the blade 34 are key aspects of the operation of a stripping tool according to the present invention. The pivoting action of the blade 34 serves to minimize the affect of the tool orientation relative to the cable or wire during the stripping operation. It also minimizes the affect of contours in the wire or cable on the stripping action. The affect of nominal variations in the force with which the cable or wire is engaged against the blade is also minimized by the pivoting action of the blade 34.

Figure 3:
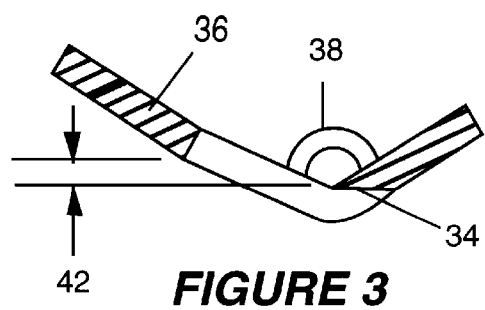
FIG. 3 is a cross-sectional view of the blade and guide as shown in FIG. 2.

A blade 34 with an integral blade guide 36 and pins 38 is shown in FIG. 3. A similar blade is incorporated into a vegetable peeler sold by Bradshaw International Incorporated under the item number 22110. A process commonly known as progressive die stamping can fabricate a blade of this type. A subsequent grinding operation may be performed to provide the leading edge of the blade 34 with suitable sharpness. Using this type of stamping and grinding process, the blade, blade guide, and pins can be effectively and economically fabricated from a single piece of material.

In the presence of a sheath interface 22 or a conductor interface 23, a tool according to the present invention exhibits a self-adjusting type of operation. Effectively, the tool is self-adjusting over a range of insulation thickness' whereby it is capable of stripping a sheath 12 or insulation 20 without stripping or damaging an underlying layer of material. This self-adjusting stripping action is a key benefit of a stripping tool according to the present invention.

Figure 4:
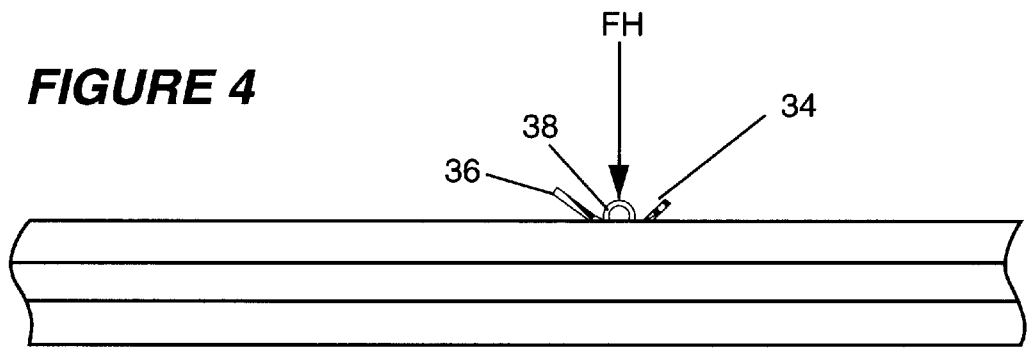
FIG. 4 is a side view showing the orientation of the blade and blade guide relative to a multi-conductor cable prior to the blade severing the cable.
Figure 5:
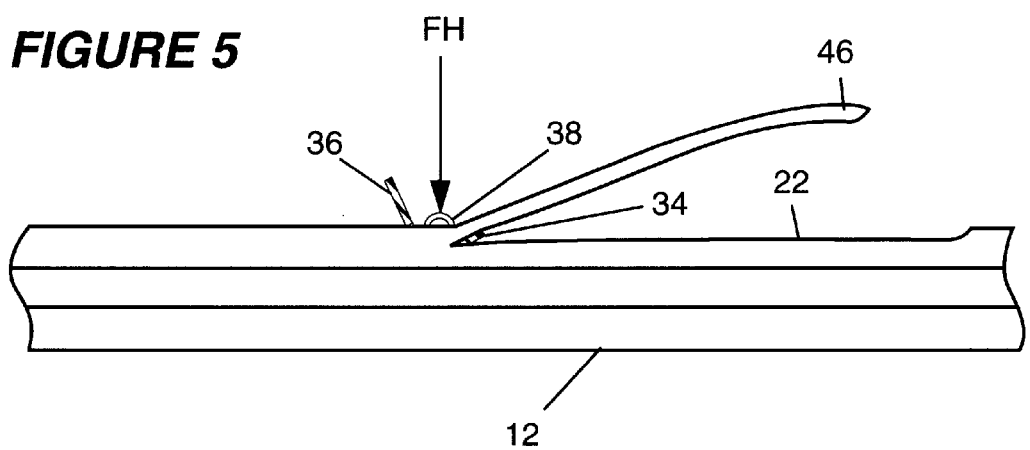
FIG. 5 is a side view showing the orientation of the blade and blade guide relative to a multi-conductor cable following the blade severing the sheath.

As shown in FIG. 4, when stripping a sheath 12 from a cable 10, the blade 34 and blade guide 36 rest on the sheath 12 prior to initiating the stripping operation. If a means of biasing the upper arm 28 and the lower arm 26 to an open position is incorporated into the tool, the blade 34 and blade guide 36 may not come into contact with the sheath 12 until a nominal level of force is applied between upper arm 28 and lower arm 26. Movement of the tool along the longitudinal axis of the cable 10 and the applied normal force FH act to initiate the blade 34 severing the surface of the material being stripped and begin the stripping operation. As shown in FIGS. 5 and 7, the blade 34 continues to cut down to the sheath interface 22 between sheath 12 and insulation 20 so long as the movement of the tool is continued and the applied normal force FH is maintained at a sufficient level.

By applying a force to the upper arm 28 and lower arm 26 of the handle 24, an applied normal force FH which acts on the blade 34 and blade guide 36 is established. The applied normal force FH is translated to the blade 34 by the holes 40 in the blade-carrying portion 30 of the handle 24 and by the pins 38 which are attached to the blade 34. This construction is shown in FIG. 2. With grossly insufficient applied normal force FN, the blade 34 would simply slide across the surface of the material being stripped without cutting into it. With moderately insufficient applied normal force FH, the blade 34 might penetrate and begin stripping the material but would not reach and maintain the depth of the sheath interface 22. Controlling the applied force FH such that the tool strips properly requires that a suitable level of user skill be developed. Once the user develops this level of skill, the tool will consistently and repeatedly perform its intended function with little effort from the user.

The blade guide 36 operates to position blade 34 in a preferred orientation that is conducive for initiating the stripping operation. The angle between the blade 34 and the blade guide 36 as well as the magnitude of the offset 42 largely contribute to the orientation of the blade 34 relative to the surface of the material being stripped. The preferred orientation of the blade 34 is such that a sufficient yet not excessive applied normal force FH will result in the leading edge of the blade 34 severing the material being stripped.

Figure 6:
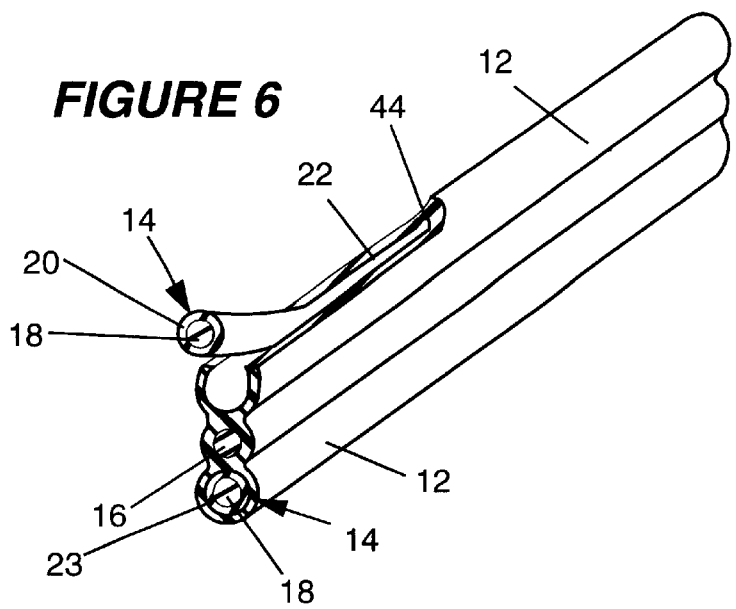
FIG. 6 is a perspective view of a multi-conductor cable with a portion of the outer sheath stripped using the stripping tool according to the present invention.

FIG. 6 shows a cable 10 wherein the outer sheath 12 of the cable 10 has been stripped to form stripped region 44. Following this stripping operation, the insulated conductor 18 can be pulled from within the sheath 12.

Several aspects of a tool according to the present invention contribute to its self-adjusting capability. The ability to control (through the upper arm 28 and lower arm 26 of the handle 24) the magnitude of the applied normal force FH which engages the insulated wire 14 or cable 10 against the blade 34 is one aspect. The pivoting action of the blade 34 relative to the blade-carrying portion 30 is another aspect. A tool having a blade 34, blade guide 36, and pins 38 having a configuration as shown in FIG. 3 is yet another aspect.

The dimensions of the blade 34, the offset 42 between the leading edge of the blade 34 and the dimensions of the blade guide 36, and the relative angle between the blade 34 and blade guide 36 contribute to determining the maximum attainable strip depth. Once the blade 34 severs the sheath 12 or insulation 20, the blade rotates about an axis defined by an axis through the pins 38. The offset 42, as shown in FIG. 3, between the blade 34 and blade guide 36 determines the maximum strip depth. The magnitude of offset 42 must be equal to or nearly equal to the thickness of the material being stripped to allow the blade 34 to reach the sheath interface 22 or conductor interface 23. In a preferred embodiment where the blade 34 and blade guide 26 are unitary, the offset 42 is 0.045". However, the offset 42 may be as much as twice the thickness of the material being stripped and will still providing the desired stripping operation. To facilitate utility of a tool of the present invention with wires and cables having a large variation in insulation and sheath thickness, it may be desirable to employ a blade guide 36 which permits the offset 42 to be adjustable. The specific dimension of the offset 42 would be dictated by the thickness of the material being stripped.

By applying a sufficient force to the handle 24, the blade 34 is maintained at a depth preferably equal to the thickness of the material being stripped. As shown in FIG. 7, once the blade attains a depth at or near its maximum strip depth, the blade 34 is subjected to a negative-acting normal force FN applied by the non-stripped portion of the material being stripped as well as by a positive-acting normal force FP applied by the portion of the material that is being stripped. These two normal forces act in opposing directions to each other. Providing they were of equal magnitude, they would cancel each other and the blade 34 would not have a tendency to change strip depth. However, since the material being stripped is of a thinner cross section than the material not being stripped, the material not being stripped generates a negative-acting normal force FN of greater magnitude than the positive-acting normal force FP applied by the material that is being stripped. Absent an applied normal force FH, this imbalance in the negative-acting normal force FN and the positive-acting normal force FP results in the blade 34 having a tendency to exit the material being stripped. By applying sufficient force on the handle 24, the applied normal force FH and positive-acting normal force FP provide a combined normal force of a magnitude equal to or greater than the negative-acting normal force FN. This force structure maintains the blade 34 at a depth preferably equal to sheath interface 22 or conductor interface 23.

Where the applied normal force FH and the positive acting normal force FP combine to provide a normal force greater than the negative-acting normal force FN, this force structure does not result in the blade 34 attempting to cut to a depth greater than the sheath interface 22 or conductor interface 23. This condition is largely due to the blade 34 being at an acute angle relative to the longitudinal axis of the insulated wire 14 or cable 10 once the blade 24 attains its maximum strip depth. When acted on by the negative-acting normal force FN and positive-acting normal force FP, the profile of the blade 34 results in the normal forces maintaining the blade 34 an acute angle relative to the longitudinal axis of the wire 14 or cable 10. With the blade 34 in this orientation, an excessive force would have to be applied to the handle 24 for the blade 34 to traverse the sheath interface 22 or conductor interface 23.

Although not part of a tool according to the present invention, the presence of a physical or material discontinuity between the material being stripped and an underlying layer of strippable material also contributes to a tool of the present invention being able to strip to a depth preferably equal to the sheath interface 22 without stripping an underlying layer of material. In the case of a physical discontinuity such as a gap between the two layers of material, the relative hardness of the material being stripped and the underlying material is not critical. In the case of a material discontinuity such as where the two layers of material are of substantially different hardness, the presence of a physical gap is not critical.

A physical interface or a difference in material properties can establish a sheath interface 22. So long as there is a defined separation between the sheath 12 and insulation 20, a sheath interface 22 sufficient for operation of the tool will be present. Typically, the sheath 12 is extruded over the insulation 20 with the insulation layer 20 being cooled to a temperature whereby the sheath 12 and insulation 20 are not thermally or molecularly bonded to each other. In this type of manufacturing process, a cable 10 with a sheath interface 22 having a finite, physical gap between the sheath 12 and insulation 20 will result. (see FIG. 1A)

The inherent difference between the hardness of the insulation 20 and the conductor 18 of insulated wire 14 establishes a suitable conductor interface 23. The blade 34 strips down to the conductor 18, but is unable to cut into it. Therefore, with sufficient force applied to the upper arm 18 and lower arm 26 of handle 24, the blade strips the insulation 20 to a depth preferably equal to the thickness of the insulation 20. FIG. 8 shows the results of stripping the insulation 20 of insulated wire 14 to expose the conductor 18.

The sliver-like section 46 shown in FIG. 9 illustrates a section of insulation 20 or sheath 12 that is removed by the stripping tool of the present invention. The actual cross-sectional profile of the sliver-like section is determined by the size of arch 48. The size of ached 48 is controlled at least in part by the strip depth, the orientation of the blade 34 relative to the cable or wire, by the insulation thickness of the insulation 20 or sheath 12, and by the amount of clearance between the layer being stripped and the underlying layer.

The blade guide 36 shown in FIG. 10 includes an offset adjuster 50. The offset adjuster 50 allows for adjusting the offset to provide a required strip depth in cases of an insulation outside of a nominal thickness range for typical wires and cables. The offset adjuster 50 includes a detent 54 which is seated in a hole 52 in the blade guide. Having a detent 54 at various locations on the offset adjuster 50 allows the offset to be adjusted to different dimensions.

FIG. 11 shows a guiding portion 32 having a first guiding channel 56 and second guiding channel 48. The first guiding channel 56 has a v-shaped profile for guiding wires and cables with a generally circular cross section. The second guiding channel 58 has a u-shaped profile for guiding wires and cables with an oblong shaped cross section.

Although the description above contains many specifics, these should not be construed as limiting the scope of the invention, but as merely providing illustrations of some of the preferred and potential embodiments of the invention at the time this application was drafted. For example, it is envisioned that the blade guide 36 could be a second blade that does not cut the cable due to the direction that the cable passes over it. The guide portion 32 of the lower arm 26 could include a blade 34 and blade guide 36 such that the outer sheath 12 or insulation 20 can be stripped along two opposing edges. Thus, the scope of the invention should be determined by the appended claims and their legal equivalents along with the examples and descriptions given, rather than by the examples and descriptions alone.

I claim:

1. An insulation stripping apparatus, comprising:
   a blade-carrying portion;
   a guide portion attached to to and movable with respect to the blade-carrying portion thereby defining a variable distance between the blade-carrying portion and the guide portion, the guide portion including a channel defining a longitudinal axis;
   an elongated blade including two opposing ends and a cutting edge extending between the two opposing ends, the two opposing ends being pivotally attached to the blade-carrying portion, the blade pivoting about an axis extending in a direction generally perpendicular to the longitudinal axis; and
   a blade guide attached to the blade, a portion of the blade guide extending generally parallel to and being offset from the cutting edge of the blade thereby defining an offset distance between the cutting edge and the blade guide.

2. The apparatus of claim 1 wherein blade is in angled relationship with the blade guide.

3. The apparatus of claim 1 further comprising a handle including a first arm having the blade-carrying portion attached thereto and a second arm having the guide portion attached thereto, the first arm being pivotally attached to the second arm for enabling the guide portion to be movable with respect to the blade-carrying portion.

4. The apparatus of claim 1 wherein the blade guide is movably attached to the blade whereby the offset distance is variable.

5. The apparatus of claim 1 wherein the guide portion is pivotally attached to the blade-carrying portion.

6. The apparatus of claim 1 wherein the blade has a generally linear cutting edge, the cutting edge extending in a direction generally perpendicular to the longitudinal axis.

7. The apparatus of claim 1 wherein the blade is pivotable between a first cutting position and a second cutting position with respect to the blade-carrying portion.

8. The apparatus of claim 7 wherein the blade pivots from the first cutting position towards the second cutting position during operation.

9. The apparatus of claim 7 wherein the blade defines a first cutting direction when in the first cutting position and wherein the blade defines a second cutting direction when in the second cutting position, the second cutting direction being approximately parallel to the longitudinal axis.

10. The apparatus of claim 9 wherein the first cutting direction is in angled relationship with the longitudinal axis.

11. A tool, comprising:
   a first arm;
   a second arm, a first end of the first arm pivotally attached to a first end of the second arm;
   a blade-carrying portion attached to the first arm adjacent to a second end thereof;
   a guide portion attached to the second arm adjacent a second end thereof, the guide portion including a channel defining a longitudinal axis;
   an elongated blade including two opposing ends and a cutting edge extending between the two opposing ends, the two opposing ends being pivotally attached to the blade-carrying portion, the blade pivoting about an axis extending in a direction generally perpendicular to the longitudinal axis and being pivotable between a first cutting position and a second cutting position with respect to the blade-carrying portion; and
   a blade guide attached to the blade, a portion of the blade guide extending generally parallel to and being offset from the cutting edge of the blade thereby defining an offset distance between the cutting edge and the blade guide.

12. The apparatus of claim 11 wherein the blade pivots from the first cutting position towards the second cutting position during operation.

13. The apparatus of claim 11 wherein the first cutting direction is in angled relationship with the longitudinal axis.

14. The apparatus of claim 11 wherein the blade defines a first cutting direction when in the first cutting position and wherein the blade defines a second cutting direction when in the second cutting position, the second cutting direction being approximately parallel to the longitudinal axis.

15. The apparatus of claim 14 wherein the first cutting direction is approximately perpendicular to the longitudinal axis.

16. A tool, comprising:
   a handle;
   a blade-carrying portion attached to a first portion of the handle;
   a guide portion attached to a second portion of the handle, the second portion of the handle being movable with respect to the first portion of the handle thereby defining a variable distance between the blade-carrying portion and the guide portion, the guide portion including a channel defining a longitudinal axis;
   an elongated blade including two opposing ends and a cutting edge extending between the two opposing ends, the two opposing ends being pivotally attached to the blade-carrying portion, the blade pivoting about an axis extending in a direction generally perpendicular to the longitudinal axis and being pivotable between a first cutting position and a second cutting position with respect to the blade-carrying portion; and
   a blade guide attached to the blade, a portion of the blade guide extending generally parallel to and being offset from the cutting edge of the blade thereby defining an offset distance between the cutting edge and the blade guide.

* * * * *